Figure 1:
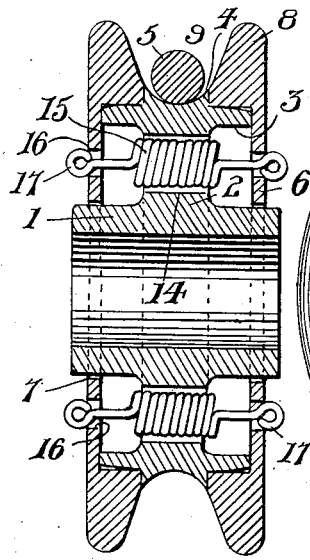

W. M. BOYER.
TROLLEY WHEEL.
APPLICATION FILED DEC. 4, 1911.

1,024,970.

Patented Apr. 30, 1912.

WITNESSES

INVENTOR
W. M. Boyer
BY
ATTORNEYS

UNITED STATES PATENT OFFICE.

WILLIAM M. BOYER, OF JOHNSTOWN, PENNSYLVANIA.

TROLLEY-WHEEL.

1,024,970.

Specification of Letters Patent.

Patented Apr. 30, 1912.

Application filed December 4, 1911. Serial No. 663,695.

*To all whom it may concern:*

Be it known that I, WILLIAM M. BOYER, a citizen of the United States of America, residing at Johnstown, in the county of Cambria and State of Pennsylvania, have invented certain new and useful Improvements in Trolley-Wheels, of which the following is a specification, reference being had therein to the accompanying drawing.

This invention relates to trolley wheels, and the primary object of my invention is to provide a sectional trolley wheel wherein novel means is employed for retaining the wheel upon a trolley wire, whereby the wheel cannot become accidentally displaced when encountering irregularities in the wire, when passing around a curved section, encountering frogs and guard rails or any other overhead construction.

Another object of this invention is to provide a trolley wheel with yieldable rim flanges that are normally maintained in proximity to a wire, and can yield when a frog is encountered.

A further object of the invention is to provide a sectional trolley wheel consisting of comparatively few parts that are easy to assemble, durable, and highly efficient for the purposes for which they are intended.

With the above and other objects in view the invention resides in the novel construction, combination and arrangement of parts to be hereinafter specifically described and then claimed.

Reference will now be had to the drawing wherein there are illustrated the preferred embodiments of the invention, but it is to be understood that the structural elements are susceptible to such variations as fall within the scope of the appended claims.

Figure 2:
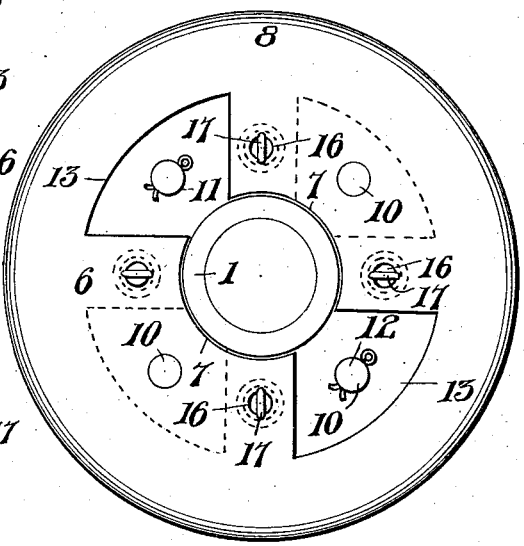
Figure 3:
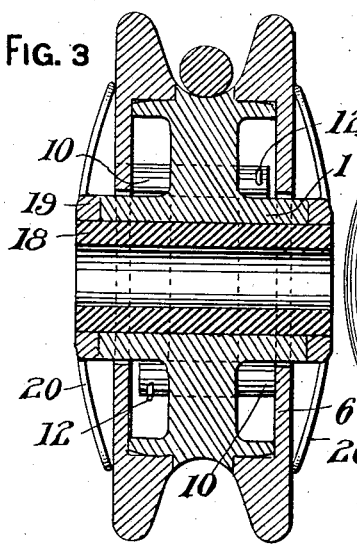
Figure 4:
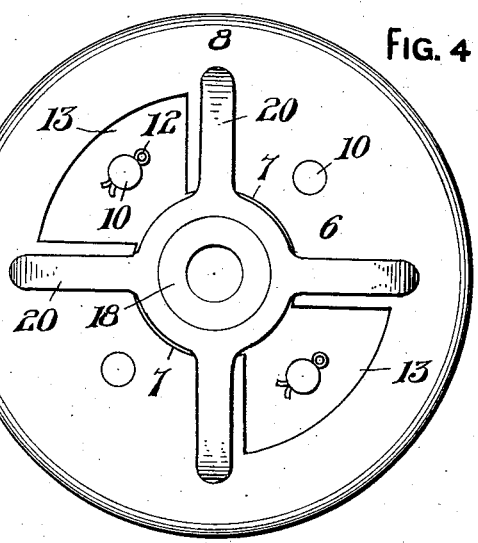
Figure 5:
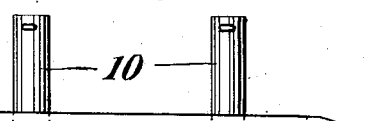

In the drawing:—Figure 1 is a sectional view of the preferred form of wheel. Fig. 2 is a side elevation of the same. Fig. 3 is a sectional view of a modified form of wheel. Fig. 4 is a side elevation of the same, and Fig. 5 is a plan of a detached rim flange.

A wheel in accordance with this invention comprises a hub 1 and intermediate the ends of said hub there is an annular web 2. The web supports an annular rim 3 and said rim, intermediate the edges thereof, has an annular wire base 4 for a trolley wire or electric conductor 5. The outer side of the base 4 is concave to accommodate the wire 5. Movably mounted upon the ends of the hub 1 are side plates 6 having openings 7 providing clearance for the ends of the hub. The side plates 6 support rim flanges 8 that extend onto the rim 3 and coöperate with the concave wire base 4 in providing an annular groove 9 for the wire 5.

The side plates 6 are provided with integral inwardly projecting pins 10, the pins of one plate being staggered with relation to the pins of the other plate, said pins extending through equally spaced openings 11 provided therefor in the web 2 of the wheel. The ends of the pins 10 are provided with cotter pins 12 to prevent the pins and side plates from becoming accidentally displaced. Easy access is had to the ends of the pins 10 by virtue of the oppositely disposed segment-shaped openings 13 formed in the side plates 6.

The web 2 of the wheel is provided with equally spaced openings 14, these openings being arranged intermediate the openings 11. The openings 14 accommodate coiled retractile springs 15 having the ends thereof extending through openings 16 provided therefor in the side plates 6. The ends of the springs 15 terminate in eyes 17 that anchor the ends of said springs relatively to the plates 6.

In Figs. 3 and 4 of the drawing, there is illustrated a substitute for the springs 15, which obviates the necessity of providing the web 2 with the openings 14 and the side plates 6 with the openings 16. The hub 1 is provided with a bushing 18 and mounted upon the ends of said bushing are rings 19 supporting radially disposed curved resilient arms 20 that engage the outer sides of the plates 6 and retain said plates in engagement with the rim 3 of the wheel. In either of the forms the side plates are yieldably supported and the area of the groove 9 can be increased when a frog or guard rail is encountered. Either of said plates can yield when pressure is brought to bear upon the same by the trolley wire, consequently the liability of the wire riding out of the groove 9 is reduced to a minimum.

What I claim is:—

1. In a trolley wheel, a hub, an annular web carried thereby, an annular rim supported by said web and having a trolley wire base, side plates movably mounted upon the ends of said hub, flanges carried by said side plates and overlapping said rim to coöperate with the latter in providing a groove for a trolley wire, inwardly projecting pins carried by said side plates and extending through the web of said wheel means extending through said pins to limit the outward movement of said side plates, and means engaging said side plates for retaining the rim flanges thereof normally upon said rim.

2. In a trolley wheel, a hub, a web carried thereby, a rim carried by said web, side plates movably mounted upon the ends of said hub, rim flanges carried by said side plates and extending onto said first mentioned rim to provide an annular groove for a trolley wire, springs adapted to yieldably hold said rim flanges upon said rim, inwardly projecting pins carried by said side plates and extending through the web of said wheel and means carried by the pins to limit the outward movement of said side plates, the pins of one plate being staggered with respect to the pins of the other plate.

3. A trolley wheel comprising a hub, a web carried thereby and formed with a series of openings, a rim carried by the web and of greater width than the width of the web, side plates movably mounted upon the ends of the hub and provided with inwardly extending flanges overlapping said rim to provide an annular groove for the trolley wire, coiled springs seated in the openings of said web, means whereby the ends of said springs are connected to said side plates for yieldingly holding said rim flanges upon said rim, inwardly projecting pins carried by said side plates and extending through said web, and means carried by the said pins for limiting the outward movement of said side plates.

In testimony whereof I affix my signature in the presence of two witnesses.

WILLIAM M. BOYER.

Witnesses:
JOHN BOYER,
C. E. WISER.

---

Copies of this patent may be obtained for five cents each, by addressing the "Commissioner of Patents. Washington, D. C"